H. D. ROBINSON.
PLANT SUPPORT.
APPLICATION FILED OCT. 21, 1907.

988,898.

Patented Apr. 4, 1911.

WITNESSES

INVENTOR
Henry D Robinson

UNITED STATES PATENT OFFICE.

HENRY D. ROBINSON, OF RICHMOND, INDIANA.

PLANT-SUPPORT.

988,898.

Specification of Letters Patent.  Patented Apr. 4, 1911.

Application filed October 21, 1907. Serial No. 398,528.

*To all whom it may concern:*

Be it known that I, HENRY D. ROBINSON, a citizen of the United States, residing at the city of Richmond, in the county of Wayne, State of Indiana, have invented a new and useful Plant-Support, of which the following is a specification.

This invention relates to a plant support, which is adapted to hold a plant in an upright position, while it is growing.

Another object of the invention is to provide means whereby the supporting arm may be conveniently attached to its standard.

Another object of the invention is to provide means whereby the supporting arm may be firmly held in any adjusted position.

It is also the purpose of this invention to improve generally upon devices of the class indicated.

Figure 2:
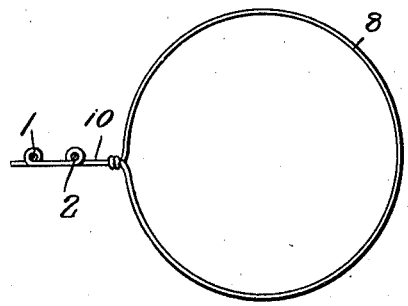
Figure 4:
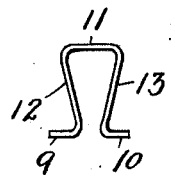
Figure 5:
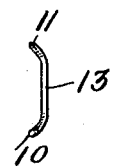
Figure 3:
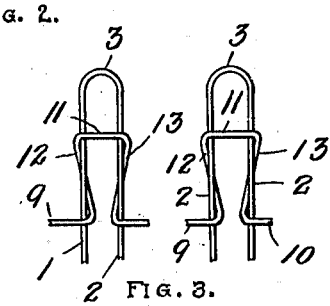
Figure 1:
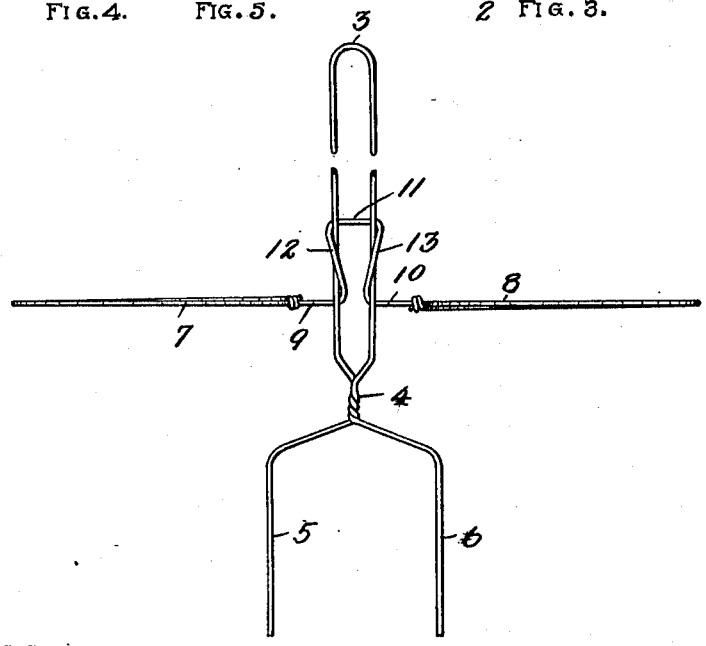

In the drawings, Figure 1 is an elevational view of a plant support constructed in accordance with my invention, parts of the standard being broken away to shorten the view; Fig. 2 is a view partly in plan and partly in section of a plant support constructed in accordance with my invention; Fig. 3 is an elevation showing the connecting device as used in connecting two or more standards together; the arms being broken away. Fig. 4 is a detail elevational view of the fastening means; and Fig. 5 is an end view thereof.

In the embodiment of the invention selected for illustration, I employ a standard comprising two parallel vertically extending bars 1 and 2. These bars are shown as being connected at their upper extremities by a cross-bar or connecting member 3, and the lower extremities of said bars 1 and 2 are connected by twisting portions thereof, one upon the other as shown at 4. The extreme lower ends of said bars 1 and 2 terminate in pins or anchors 5 and 6.

The standard just described may be formed of a single strand of stout wire, or it may be formed of strips of suitable material properly secured together. The standard will be of sufficient height to provide for the particular plant of which care is to be taken. Slidable upon the standard is a plant supporting device comprising two rings or loops extending in opposite directions from said standard and connected by an open loop which engages the standard.

The loops for supporting the plant are best shown in Figs. 1 and 2. The loop 7 and the loop 8 are shown as being formed from wire bent in the shape of a ring and having ends wound around arms or stems 9 and 10. The arms 9 and 10 are connected to a bar 11 by the diverging connecting portions 12 and 13. The bar 11 is in the same vertical plane as the arms 9 and 10, while the connecting portions 12 and 13 are in the same vertical plane, but in different planes than are the arms 9 and 10 and the bar 11. By this construction, the arms 9 and 10 and the bar 11 are on one side of the standard, while the connecting portions 12 and 13 are on the opposite side of the standard.

In assembling the support, the open loop formed by the bar 11 and the connecting portions 12 and 13 is inserted between the two bars 1 and 2, and the bar 11 is then brought up over the bar 3 so as to bring it on the same side of the standard as the arms 9 and 10, and if said loop is then slid upon the bars 1 and 2, the structure will be properly assembled. By arranging the arms 9 and 10 and the bar 11 as just described, the loops 7 and 8 will be rigidly connected to the standard, so that while the loop formed by the bar 11 and the connecting portions 12 and 13 may be moved vertically upon the standard to accommodate the growing plant, said loops 7 and 8 will be held in any adjusted position without any further fastening device.

With the standard made of strips of material, the horizontal, or plant support portion may be assembled with the sides of the standard before the end, or ends, are connected by a cross-bar, or otherwise; thus obviating the necessity of slipping the bar 11 between the bars 1 and 2, or over the bar 3.

By reference to Fig. 3, it will be observed that the connecting portions 12 and 13 are bent slightly at their extremities, so as to permit the arms 9 and 10 and the bar 11 to be in one plane, while the portions 12 and 13 remain in another plane, the advantage of this being that the bar 11 may be readily slipped over the end of the standard. While I have illustrated and described the single plant support, it is obvious that a multiplicity of supports may be employed to form a trellis, but as each support will be of substantially the same form as the one shown in the drawing, I have deemed it unnecessary to illustrate a plurality of them.

Although I have described my invention with two loops, where one plant is to be supported, I use it as shown in Fig. 2 with one loop only.

Having thus described my invention, what I claim as new therein and desire to secure by Letters Patent is:—

1. The combination with a standard having parallel sides, of a plant supporting member formed, from one piece of metal, the ends of which are formed into rings, and the center bent to make a projection at an angle to the plane of the rings, and constructed to adapt it to be removably and adjustably assembled with the standard by passing the projection between the sides and over the end of the standard.

2. In a plant support, the combination with a standard having spaced vertical bars, of a horizontal portion consisting of a piece of metal bent to form a projection; the end of said projection forming a cross bar bearing against the side of said standard, the sides of said projection being formed to pass entirely around the respective sides of the standard and terminate in arms or connecting members.

3. The combination, with a standard having parallel bars, of a transverse bar bearing against one side of the standard, converging portions passing across the respective side bars of the standard on the opposite side from the transverse bar, said converging portions being bent at their ends to connect the bars to arms that are parallel to said bar and on the same side of the standard, said arms being connected to the converging portions from between the side bars of the standard.

4. In a device of the class described, the combination with a standard, of two oppositely disposed loops for receiving plants, and means for supporting said loops on said standard, comprising a bar having downwardly converging connecting portions and connections between said loops and said connecting portions.

5. In a device of the class described, the combination with a standard, of means for receiving plants said means being adjustable upon said standard, and comprising an intermediate loop having a bar with downwardly converging connecting portions and outwardly projecting arms connected to said connecting portions, and loops carried by said arms.

6. In a device of the class described, the combination with a standard comprising spaced parallel bars, of an arm provided with a loop, said loop being wholly supported by said arm, a bar spaced from said arm and on the same side of the standard, and means for connecting said bar and said arm, said means being on the opposite side of the standard.

7. In a device of the class described, the combination with a standard having spaced parallel bars, of an arm, a loop carried by one end of said arm and means for adjustably connecting said arm to said standard, said means comprising a loop having a bar with downwardly converging portions engaging the parallel bars of the standard one of said downwardly converging portions being connected to the loop supporting arm.

HENRY D. ROBINSON.

Witnesses:
 WM. H. KELLEY,
 NETTIE GRIMES.

---

Copies of this patent may be obtained for five cents each, by addressing the "Commissioner of Patents, Washington, D. C."